United States Patent
Ho

(10) Patent No.: US 7,957,534 B2
(45) Date of Patent: *Jun. 7, 2011

(54) SYSTEM AND METHOD FOR SECURITY ASSOCIATION BETWEEN COMMUNICATION DEVICES WITHIN A WIRELESS HOME NETWORK

(75) Inventor: Jin-Meng Ho, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/643,684

(22) Filed: Dec. 21, 2009

(65) Prior Publication Data

US 2010/0100740 A1    Apr. 22, 2010

Related U.S. Application Data

(63) Continuation of application No. 11/202,886, filed on Aug. 12, 2005, now Pat. No. 7,660,419.

(60) Provisional application No. 60/601,402, filed on Aug. 13, 2004.

(51) Int. Cl.
*H04K 1/00* (2006.01)

(52) U.S. Cl. .......... 380/270; 380/21; 713/168; 713/169; 713/170; 713/171

(58) Field of Classification Search .......... 713/168–171; 380/270

See application file for complete search history.

(56) References Cited

U.S. PATENT DOCUMENTS

| 7,047,405 | B2 * | 5/2006 | Mauro ........................ 713/166 |
| 7,574,599 | B1 * | 8/2009 | Zhang ......................... 713/168 |
| 2003/0210789 | A1 * | 11/2003 | Farnham et al. ............. 380/270 |
| 2004/0039906 | A1 * | 2/2004 | Oka et al. .................... 713/156 |

\* cited by examiner

*Primary Examiner* — Taghi T Arani
*Assistant Examiner* — Jason Lee
(74) *Attorney, Agent, or Firm* — Steven A. Shaw; W. James Brady; Frederick J. Telecky, Jr.

(57) ABSTRACT

Embodiments of the application describe a method and system for discovering and authenticating communication devices and establishing a secure communication link within a wireless home network without requiring a secure channel. According to an embodiment, communication devices exchange public keys using multiple messages each including at least a portion of the public key of the sending device. The devices authenticate the receipt of the public key and establish a shared master key. The shared master key is used to further derive a session key for securing the application data between the communicating devices for a current session.

10 Claims, 3 Drawing Sheets

SYSTEM AND METHOD FOR SECURITY ASSOCIATION BETWEEN COMMUNICATION DEVICES WITHIN A WIRELESS HOME NETWORK

CROSS REFERENCE TO RELATED APPLICATIONS

This application is a continuation of and claims priority under 35 U.S.C. §120 to U.S. patent application Ser. No. 11/202,886 filed Aug. 12, 2005, now U.S. Pat. No. 7,660,419. Said application claims priority from the U.S. Provisional Patent Application Ser. No. 60/601,402, filed on Aug. 13, 2004. Said applications incorporated herein by reference in its entirety for all purposes.

BACKGROUND

1. Field

The invention relates to security association using authentication and verification of communication devices via public key cryptography in a wireless network.

2. Description of the Related Art

Generally in wireless networks such as Local Area Network (LAN) or Personal Area Network (PAN), devices communicate using secure means such as encrypted data. In a home network, a user may play videos using a DVD player, camcorder, or the like, and transmit the video to a TV via a wireless network. It is possible that the transmitted video may also be played on a TV in a neighbor's home. Another possibility is that a third party within the communication range of the home network may intercept the transmission, alter it, and re-send the altered data to the user's PC. Similarly, a receiving device such as neighbor's PDA makes sure that it receives data only from an intended sender.

To avoid such interruptions and hacking, the transmitted data is usually encrypted and checked so only the intended receiving device can decrypt and validate the data using a predetermined security protocol. To this end, the communicating devices need to share a session key that is not known to other devices. The section key will then be used to secure the user traffic for the current session. The devices use another shared session key for their data communications in the next session to reduce the chance of the session key being compromised or minimize the damage in case the session key is compromised.

To derive a session key, the two communicating devices need to establish a shared master key first. Good security practice does not use the master key to directly encrypt the user application data. Public key (PK) cryptography allows two devices to establish a shared secret, i.e., a shared master key, in broad light—in the presence of eavesdroppers. That is, PK cryptography is not vulnerable to passive attack. Unfortunately, existing techniques of PK cryptography is subject to active attack. An attacker can impersonate itself as one of the intended communication partners and transmit its public key under the disguise of an intended device, thereby tricking the other device to exchange data with the attacker without the device knowing that its communication is being hijacked by an unwanted third party. This is known as man-in-the-middle attack.

Since PK cryptography provides a friendly use model, especially in a wireless environment, there is a need for a method and system for applying PK cryptography to establish a security association, i.e., to establish a shared master key, between two communicating devices without the setback of man-in-the-middle attack.

The description that follows presents a series of systems, apparatuses, methods, and techniques that facilitate additional local register storage through the use of a virtual register set in a processor. While much of the description herein assumes a single processor, process or thread context, some realizations in accordance with the present invention provide expanded internal register capability customizable for each processor of a multiprocessor, each process and/or each thread of execution. Accordingly, in view of the above, and without limitation, certain exemplary exploitations are now described.

Figure 1:
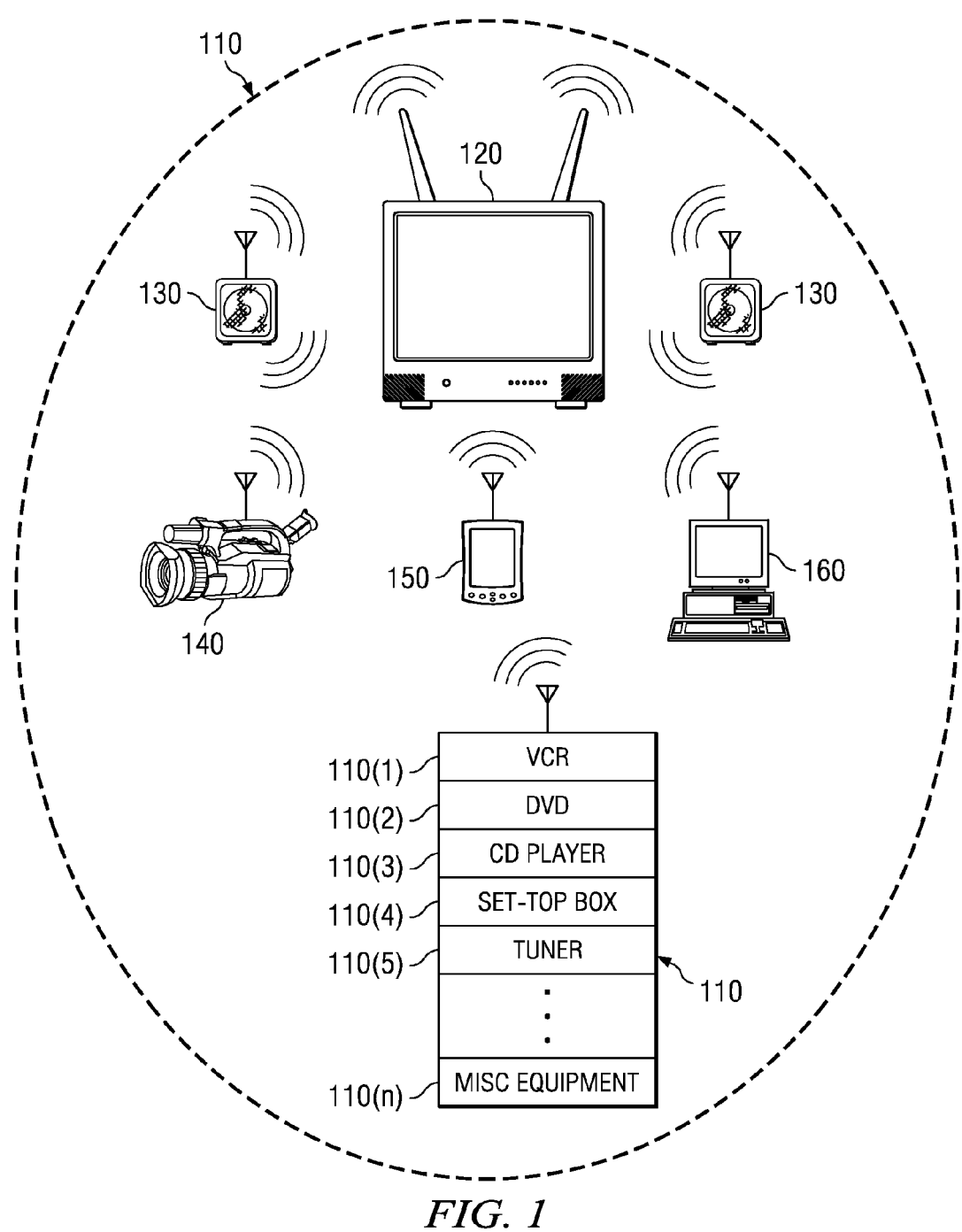
FIG. 1 illustrates an exemplary embodiment of a wireless home network.

FIG. 1 illustrates an exemplary embodiment of a wireless home network 100. The home network 100 includes various devices configured for wireless communication with each other such as an entertainment rack 110, a TV 120, various speakers 130, a camcorder 140, a PDA 150, and a PC 160. The wireless network can be based on any standard wireless network protocols such as IEEE 802.11 or similar other wireless protocols known in the art. The entertainment rack 110 includes individual devices 110(1)-(n) capable of wireless communication. For illustration purpose, only few devices are shown; however, home network 100 can include other devices such as a server, an access point, and the like devices capable of wireless communication with other devices in the home network 100.

When a device wants to communicate with another device in the home network, for example, when a user wants to play a home video recorded on camcorder 140 on the TV 120, a secure wireless communication link needs to be established between the two devices. The communication link needs to be secure because the user may not want the video to be played on a wireless capable TV in his/her neighbor's bedroom. Thus, to establish a secure communication link, the user may initiate a link establishing process on both the devices. The process can be initiated by manually pressing a corresponding button on each device, by using a remote control to simultaneously initiate the link establishment process on each device, or by any other means known for controlling the operations of these devices. When the process is initiated, each device exchanges data packets using a PK distribution protocol. The PK distribution protocol may allow a time window within which each device performs the PK exchange. In case when devices are unable to complete the PK exchange within the allocated time window, the user will be alerted by a user-device interface such as the display of a blinking red LED, and the user may choose to abort or resume establishment of the secure communication link process.

The device can indicate the initiation and execution of the secure link establishment process by activating an indicator (e.g., displaying a stable red LED or similar indicator) on the device. The device can indicate the successful completion of the process by activating a different indicator, for example, by displaying a stable green LED on the device. If devices fail to establish a secure link, then they can indicate the failure by any determined means, for example, by displaying a flashing red light, playing a distinct sound (e.g., a beep or the like), displaying an error message on the TV or on a display capable remote control, or on the display of a corresponding network controller, or the like means. If devices succeed to establish the secure link, then the user can play and enjoy the video on the TV or initiate a secure data communication between the devices.

Similarly, other secure links can be established between various other devices in the wireless network, for example, between a tuner and speakers, a DVD player and a TV, a camcorder and a VCR, a digital camera and a computer, a projector and a digital screen, and the like and combinations thereof Further, a secure link can be established in a broadcast manner also; for example, a user may want to play a movie on his/her DVD player located in a family room but everyone in the house may want to watch the movie in the comfort of their bedroom. Thus, the user can establish a secure broadcast link between the DVD player and TVs in each room. Similarly, various other combinations can be formed to communicate data on a secure link between two or more devices without having to worry about an intruder who may intercept the communication and use it or alter it before retransmitting it.

Figure 2:
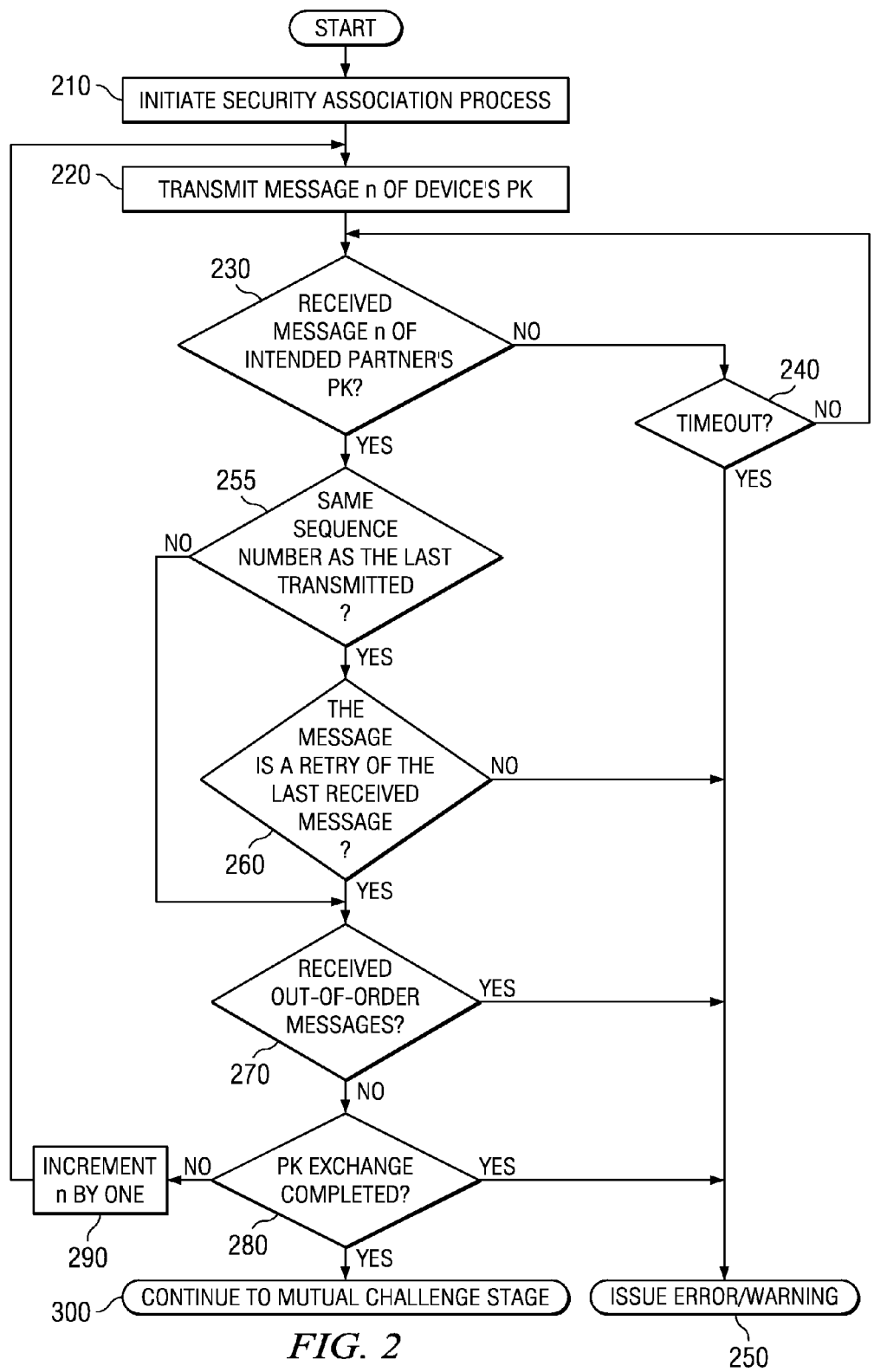
FIG. 2 is a flowchart illustrating a method of exchanging public keys for secure association of two devices in a wireless network according to an embodiment.

FIG. 2 is a flowchart illustrating a method of exchanging public keys for secure association of two devices in a wireless network according to an embodiment. The process begins by initiating the link establishment on each device; for example, a user may press an activation button on each of the two devices (e.g., manually, via Infra Red remote control, or the like) (210). A device then sends the first message of the PK distribution protocol (220). The PK distribution protocol can be defined such that each message includes a portion of the PK of the sending device and the entire PK is exchanged using 'N' messages. The number of messages the PK is divided depends upon the level of security desired between the communication devices. The larger the number of messages, the stronger the lever of security. The device may retransmit the same message if it does not receive a positive acknowledgment to the last transmission of the message.

Before proceeding to send the next message, the device checks to see if it has received the message of the same sequence number containing a corresponding portion of the PK of the intended partner (230). The device will determine whether it has received the said message within the time window specified for the PK distribution protocol, i.e., whether a timeout has occurred (240). If a timeout has not occurred, then the device continues to wait for that message from the other device. If a timeout occurs, then the device issues a warning (e.g., via red flashing indicator, error message display, or similar other means) to indicate an error and terminate the security association process (250). It is up to the user to decide whether to reinitiate the process.

The device checks to see whether it has received the message that has the same sequence number as the one it last transmitted within the specified timeout (255). If the message has the same sequence number, then the device also checks whether the message that appears to carry the same sequence number is also a retransmission of the last message received by comparing the contents of the message with the contents of the last received message (260). Such an event could occur if an imposter sent a message with the same sequence number but with part of its own PK. If the event does happen, the device also issues a similar warning as described earlier to indicate a potential security attack and terminates the security association process (250). Otherwise, the device further checks if it has received any message that is out-of-sequence order (270). An imposter might attempt to send messages containing its own PK and mislead the device to treat it as the intended partner. If the device does find a received message that is out-of-order in sequence with earlier received messages, it also issues a warning to indicate a potential security attack and terminates the security association process (250).

After the device determines that it has received an acknowledgment to its last transmitted message containing part of its PK, it has received a message of the same sequence number containing part of another device's PK, it has not received a message with the same sequence number as previously received message but with different PK contents, and it has not received any out-of-order messages, it determines if all messages containing its PK and the intended device's PK have also been transferred to each other (280). If not, the device proceeds to transmit the message containing the next portion of its PK (290), repeating the procedures described above until the PK exchange completes.

As stated above, the number of messages exchanged between devices for PK transfer may depend on a desired level of security required for the communication link between the two devices. For example, a user wanting to play an entertainment video may not care for a high level of security between a DVD player and a digital TV and may wish to complete the link establishment process as soon as possible. However, on the other hand, a surveillance video being played in a conference room of a law enforcement agency's office may require the highest level of data security. After the PK transfer is successfully completed, the device continues to a mutual challenge stage as described below with reference to FIG. 3.

After the successful transfer of the PKs, the device begins a mutual challenge stage with the intended partner (300). This stage allows the two devices to verify that they have indeed received each other's PK in entirety. It also enables both devices to derive a shared master key based on the parameters used in the challenge process. The two devices then proceed to derive a shared session key that is used to secure the application traffic for the current session. The devices may reuse the shared master key to derive a new session key for the current or a new session, thus saving the steps of the security association process for a continued or a new session.

Figure 3:
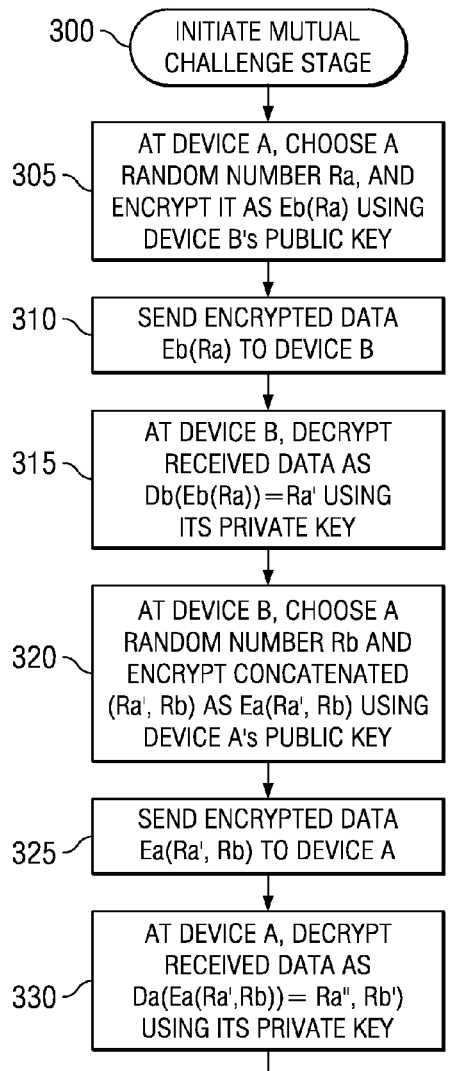
FIG. 3 is a flowchart illustrating a method of verifying the correct reception of PK from each other and deriving a shared master key for secure association of the two devices in a wireless network according to an embodiment. Description of the Preferred embodiment(s)
Figure 3:
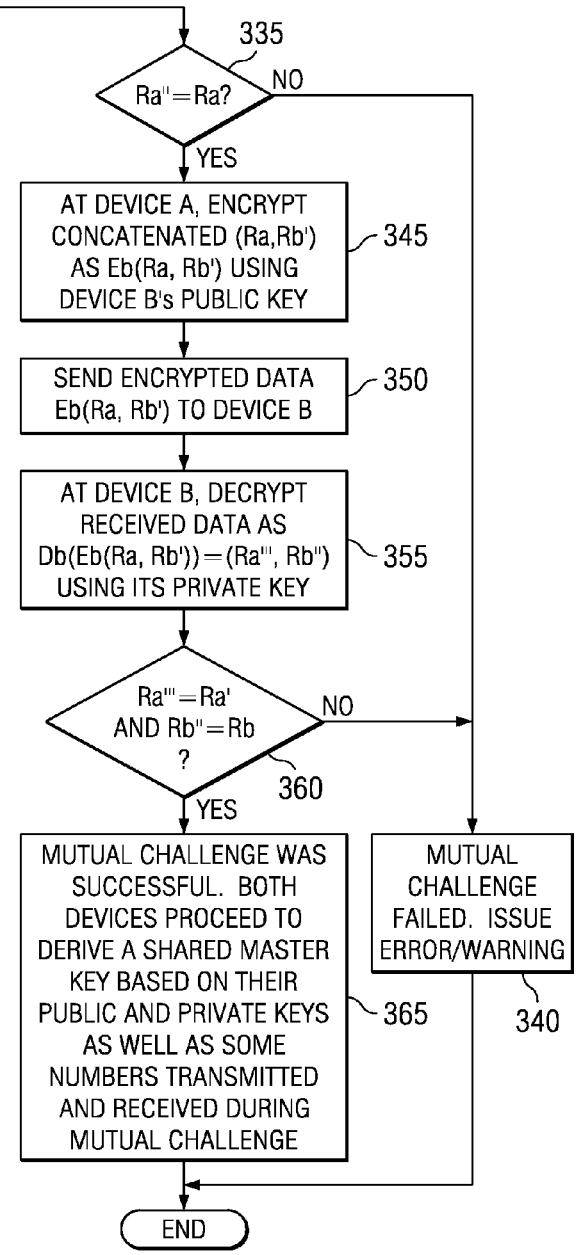

FIG. 3 is a flowchart illustrating a method of verifying the correct reception of PK from each other and deriving a shared master key for secure association of the two devices in a wireless network according to an embodiment. The mutual challenge stage is initiated on both devices A & B (e.g., a camcorder and a TV) using various means described herein above (300). After the initiation f the stage, device A chooses a random number Ra and encrypts it using device B's public key to generate an encrypted data Eb(Ra) (305). The public key of device B can be obtained as described herein above. Each device may send a message to the other device only after a previous message has been received from the other device. Each device may send a given message one or more times, but may not send messages out of sequence order.

Device A then sends the encrypted data Eb(Ra) to device B (310). When device B receives the encrypted data Eb(Ra) from device A, it decrypts the data using its private key to generate a decrypted data Ra'=Db(Eb(Ra)) (315). If device A had correctly received the public key of device B, then Ra'=Ra. Device B now chooses a new random number Rb. Device B combines Ra' and Rb into a concatenated data, and encrypts the data using device A's public key to generate an encrypted data Ea(Ra', Rb) (320). Device B then sends the encrypted data Ea(Ra', Rb) to device A (325).

Device A decrypts the received encrypted data using its own private key and generates a decrypted data (Ra", Rb') =Da(Ea(Ra', Rb)), which produces decrypted portions of the random numbers as Ra" and Rb' (330). If device A had correctly received the public key of device B and device B had correctly received the public key of device A, then Ra"=Ra'=Ra and Rb'=Rb. Device A determines whether it had correctly received the public key of device B by comparing the random number Ra that it sent to device B with the random number Ra" that it recovered from device B's returned encrypted data (335). If Ra and Ra" are not equal, then device A did not correctly receive the public key of device B or/and vice versa, and the mutual challenge stage fails (340). Device A issues a warning to indicate an error and terminates the security association process.

If Ra"=Ra, device A combines Ra and Rb' into a concatenated data (Ra, Rb') and encrypts the data using device B's public key to generate an encrypted data Eb(Ra, Rb') (345). Device A then sends the encrypted data Eb(Ra, Rb') to device B (350). When device B receives the encrypted data, it decrypts it using its private key to extract (Ra'", Rb")=Db(Eb (Ra, Rb')) (355). Device B determines whether device A correctly received its public key and it correctly received device A's public key by comparing the random number Ra' it received earlier from device A with the random number Ra'" it last recovered from device A, and the random number Rb it sent to device A with the random number Rb" it recovered from device A (360). If Ra' and Ra'" are not equal, or if Rb and Rb" are not equal, then device B determines that the PK exchange process did not succeed and the secure link establishment fails (340).

Otherwise, the mutual challenge has succeeded, that is, devices A and B have correctly obtained each other's public key (365). Once mutual challenge succeeds, each device can employ a predetermined PK cryptography method to derive a shared symmetric master key based on their public and private keys and some other information exchanged during the mutual challenge procedure such as Ra and Rb' or Ra' and Rb. Each device then can indicate the success of security association using appropriate means, e.g., by displaying a stable green light or the like. The user can then signal to the two devices to start their application data transmission and reception, e.g., by pressing the activation button again on each device or via similar other means.

The security association process ensures that an imposter cannot post as an authorized party to steal the data from the intended source device, or manipulate the intercepted data and then transmit it to the intended recipient. The process fails when a device receives messages with the same sequence number but different key contents (one sent from an imposter with its own key contents), receives messages out of sequence order (some sent from an imposter earlier or later than the true messages of the same sequence number from the intended device), or detects a failure in the final challenge stage (the entire key contents were assembled from messages sent by both the intended device and the imposter). By breaking the PK exchange protocol information into a large number of messages, it becomes more difficult for an imposter to stage an active attack on the intended communications. Thus, the number of the protocol messages to complete the PK exchange may be used as a parameter in achieving differing degrees of security association robustness. This method requires minimal user interaction/interface and no third party certificate.

The link indicator of a device indicates a successful establishment of the link only after the device has sent and received all messages of the PK distribution protocol as well as gone through the mutual challenge stage for authentication. The indicator may indicate a failure in the link establishment process when the device receives messages with the same sequence number but different key contents such as a message sent from an imposter with its own key contents, receives messages out of sequence order such as some messages sent from an imposter earlier or later than the true messages of the same sequence number from the intended device, or detects a failure in the final challenge stage such as the entire PK contents were assembled from messages sent by both the intended device and the imposter, and the like other errors as determined by the device or protocol designer. After a secure link has been established (as indicated by the indicator), the user may proceed with the application data exchanges (e.g., play video or the like). The devices each stop transmitting and receiving PK distribution protocol messages after a timeout following the initiation of the process.

For some user cases, it may be desirable or convenient to require the communicating devices to go through PK distribution procedure for each session (e.g., every time a user wants to play a movie or the like). The same procedure may be used for symmetric key distribution, but it will increase the chance of passive attack. Thus, symmetric key distribution is more vulnerable than public key distribution. If the symmetric key is overhead, then everything on the current and future sessions can be compromised. Each new session may be required to start with the symmetric key distribution, which is nevertheless weaker than public key distribution.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A wireless home network comprising:
a plurality of hardware devices configured to communicate with each other within the wireless network, wherein each one of the plurality of devices is configured to:
   initiate a secure communication link with at least one other device within the wireless home network without requiring a secure channel;
   exchange public keys with the at least one other device using a first plurality of messages, wherein each of the first plurality of messages includes at least a portion of a public key of message sending device, wherein exchanging public keys between the first and second devices further comprises:
   sending a first message of the first plurality of messages from the first device to the second device, wherein the first message includes a first portion of the public key of the first device;

receiving at the first device an acknowledgment of receipt of the first message from the second device;

sending a second message of the first plurality of messages from the second device to the first device in response to the first message received from the first device, wherein the second message includes a first portion of the public key of the second device;

receiving at the second device an acknowledgment of receipt of the second message from the first device sending a third message of the first plurality of messages from the first device to the second device only after the corresponding acknowledgment for the first message is received by the first device, wherein the third message includes a second portion of the public key of the first device;

receiving at the first device an acknowledgment of receipt of the third message from the second device;

sending a fourth message of the first plurality of messages from the second device to the first device only after the corresponding acknowledgment for the second message is received by the second device in response to the third message received from the first device, wherein the fourth message includes a second portion of the public key of the second device;

receiving at the second device an acknowledgment of receipt of the fourth message from the first device;

verify correct reception of the public keys; and generate a shared symmetric master key for the secure communication link using the public key, the private key and a random number.

2. A wireless network according to claim 1, wherein each one of the first plurality of messages includes a sequence number, and the plurality of devices are further configured to:
send messages to the other devices in an order of the sequence numbers.

3. A wireless network according to claim 2, wherein each one of the plurality of wireless devices is further configured to:
issue an error warning and terminate the secure link establishment process if the device receives a message that is out-of-order of the sequence number.

4. A wireless network according to claim 1, wherein each one of the plurality of devices is configured to:
setup a time window for the exchange of public keys; and
indicate the initiation of the secure communication link, wherein devices exchanges their public keys within the time window.

5. A communication device configured to:
establish a secure communication link with at least one other device in a wireless home network without requiring a secure channel;
exchange public keys with the other device using a first plurality of messages, wherein each of the first plurality of messages includes at least a portion of a public key of message sending device, wherein exchanging public keys between the first and second devices further comprises:
sending a first message of the first plurality of messages from the first device to the second device, wherein the first message includes a first portion of the public key of the first device;
receiving at the first device an acknowledgment of receipt of the first message from the second device;
sending a second message of the first plurality of messages from the second device to the first device in response to the first message received from the first device, wherein the second message includes a first portion of the public key of the second device;
receiving at the second device an acknowledgment of receipt of the second message from the first device
sending a third message of the first plurality of messages from the first device to the second device only after the corresponding acknowledgment for the first message is received by the first device, wherein the third message includes a second portion of the public key of the first device;
receiving at the first device an acknowledgment of receipt of the third message from the second device;
sending a fourth message of the first plurality of messages from the second device to the first device only after the corresponding acknowledgment for the second message is received by the second device in response to the third message received from the first device, wherein the fourth message includes a second portion of the public key of the second device;
receiving at the second device an acknowledgment of receipt of the fourth message from the first device;
verify correct reception of the public keys; and
generate a shared symmetric master key for the secure communication link using the public key, the private key and a random number.

6. A communication device according to claim 5, wherein each one of the first plurality of messages includes a sequence number, the communication device is configured to
send messages to the other device in an order of the sequence numbers; and
the communication device does not send a message including a portion of the corresponding public key to the other device if the communication device receives a message that is out-of-order of the sequence number.

7. A communication device according to claim 6, further configured to:
issue an error warning, and
terminate the secure link establishment process if a message that is out-of-order of sequence is received.

8. A communication device according to claim 5, further configured to:
setup a time window for the exchange of the public keys; and
indicate the initiation of the secure communication link, wherein the communication device and the other device exchange their public keys within the time window.

9. A communication device according to claim 5, wherein the communication device establishes the shared symmetric master key with the other device based on their respective public keys and private keys and information exchanged in verifying the correct reception of their respective public keys.

10. A communication device according to claim 5, further configured to:
use the shared symmetric master key to derive a shared session key for one or more application sessions on the secure communication link with the other device, wherein the session key is used to secure application data exchanged between the communication device and the other.

* * * * *